United States Patent [19]

Krock

[11] Patent Number: 5,547,152

[45] Date of Patent: Aug. 20, 1996

[54] PIPE MOUNTING BRACKET

[75] Inventor: Albert W. Krock, Shelby Township, Mich.

[73] Assignee: Connection Systems Group, Auburn Hills, Mich.

[21] Appl. No.: 353,085

[22] Filed: Dec. 9, 1994

[51] Int. Cl.$^6$ ........................................ F16L 3/08
[52] U.S. Cl. ........................... 248/74.1; 24/274 WB; 248/903
[58] Field of Search ..................... 248/74.1, 74.2, 248/74.4, 74.5, 65, 49, 55, 67.5, 67.7, 62, 903; 24/274 WB, 278, 275

[56] References Cited

U.S. PATENT DOCUMENTS

| | | | |
|---|---|---|---|
| 3,963,205 | 6/1976 | Hageman | 248/55 |
| 3,980,262 | 9/1976 | Lee | 248/55 X |
| 4,252,289 | 12/1981 | Herb | 248/62 |
| 4,609,171 | 9/1986 | Matsui | 248/74.3 |
| 4,623,102 | 11/1986 | Hough, Jr. | 248/68.1 |
| 4,669,156 | 6/1987 | Guido et al. | |
| 4,936,530 | 6/1990 | Wollar | 248/71 |
| 4,958,792 | 9/1990 | Rinderer | 248/74.2 |
| 5,133,523 | 7/1992 | Daigle et al. | 248/62 |
| 5,172,879 | 12/1992 | Calmettes et al. | 248/74.3 |
| 5,301,917 | 4/1994 | Dyer | 248/74.2 |

FOREIGN PATENT DOCUMENTS

| | | | |
|---|---|---|---|
| 697380 | 10/1940 | Germany | 248/74.4 |
| 591653 | 9/1977 | Switzerland | 248/74.4 |

*Primary Examiner*—Ramon O. Ramirez
*Attorney, Agent, or Firm*—Reising, Ethington, Barnard & Perry

[57] ABSTRACT

A clamp assembly (10) includes a corrosion resistant coated pipe (12) secured to a plastic two piece clamp (14). The clamp has a arcuate pipe receiving base member (16) and a flat cover member (20) that is snap fitted to the base member to clamp about the pipe. The pipe has a flat (22) that abuts the cover member such that the pipe is secured against axial slippage and rotational movement with respect to the clamp (14).

12 Claims, 2 Drawing Sheets

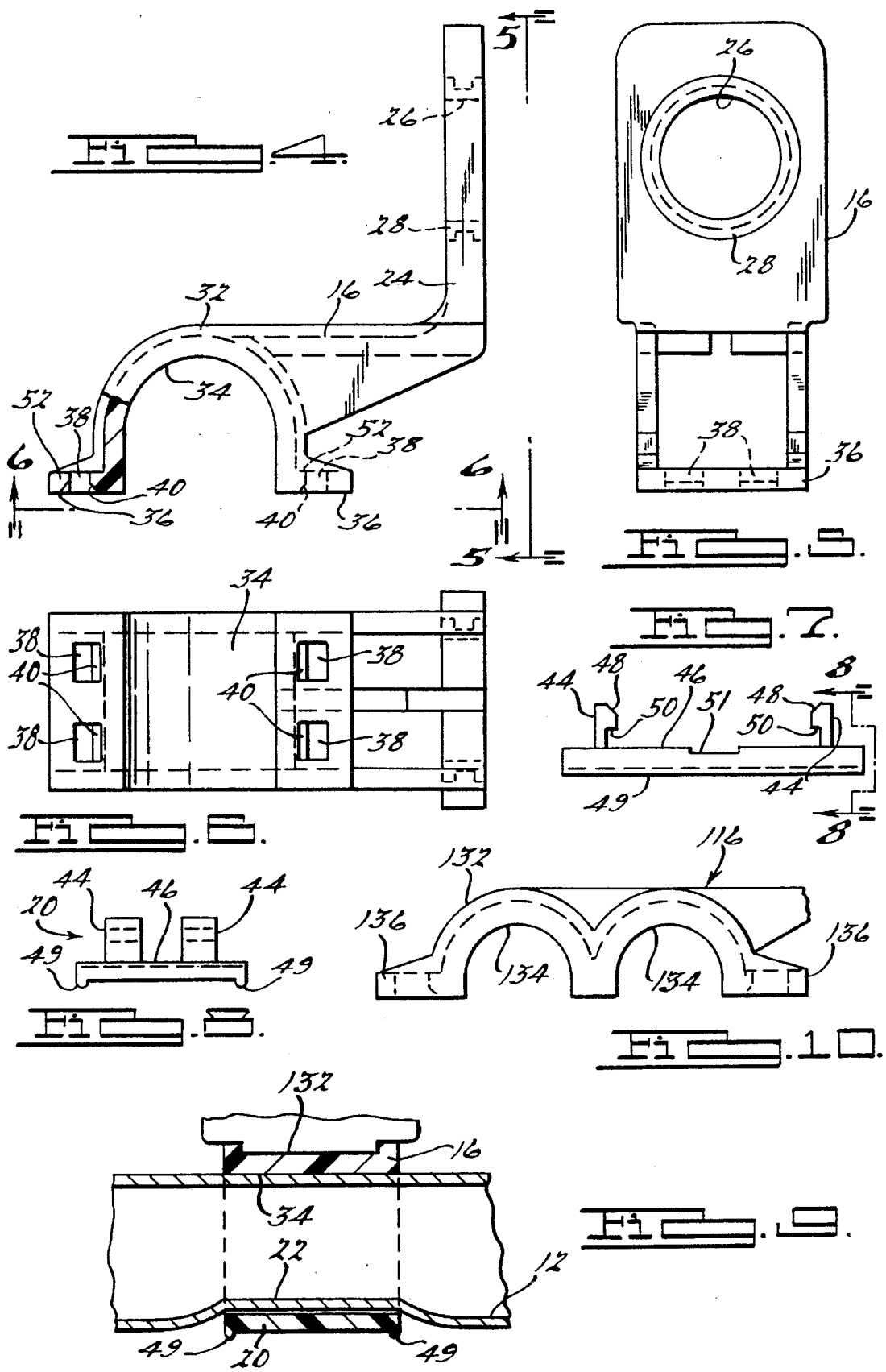

PIPE MOUNTING BRACKET

TECHNICAL FIELD

The field of this invention relates to a support bracket for a pipe and more particularly to a two piece pipe clamp for automotive vehicle applications.

BACKGROUND OF THE DISCLOSURE

In automotive vehicles, there are a great number of clamps securing tubes, pipes and wires in position. Some clamps only need to secure against lateral motion such as clamps that hold rubber hoses in place. Other clamps need to secure pipes to limit the axial motion and rotational motion. Metal pipes attached to the automotive vehicle and used for transporting coolant and hydraulic brake fluid throughout the automotive vehicle need to be securely fastened to prevent as much movement and vibration as possible.

The clamps for these applications are made of metal and are welded directly to the pipe. The clamp is then bolted or screwed in place to the engine, engine compartment wall or other fixed structure in the engine compartment.

The widespread use of corrosion resistant coatings on metal pipes and conduits is intended to greatly increase the useful life of the pipe or conduit against both the degrading effects of the fluid within the pipe and also the harsh external environment encountered by the engine compartment or under the vehicular body that include road salt and water.

However, the welding of conventional clamps on these coated pipes destroys the corrosion resistant coating on the metal pipes at the welding spot. As a result, corrosion and holes eventually occur at the very spot where the clamp is secured onto the pipe at a speed or rate no slower than for untreated pipes. The intended advantage of the corrosion resistant coating is completely undermined by the welding process of the clamp onto the treated pipes.

What is needed is a clamp that affixes a corrosion resistant coated pipe securely against slippage and rotation while maintaining the integrity of the corrosion resistant coating on the pipe.

SUMMARY OF THE DISCLOSURE

In accordance with one aspect of the invention, a bracket for supporting and affixing automotive containing pipe elements in lateral, axial and rotational directions to an automotive vehicle includes a base member having a first end section constructed for securement to the vehicle. The base member has a pipe engaging section, preferably an arcuate section sized to receive a pipe element. The base member also has opposing flanges extending radially outward from opposite ends of the arcuate section.

A closure member has a substantially planar surface dimensioned to engage an indented section in the pipe element. The indented section is preferably a flat in the wall of the pipe. The closure member and opposing flanges having complementary fastener elements for affixing said closure member to the flanges whereby the substantially planar surface limits axial slippage of said pipe and prevents rotation of said pipe within the clamp.

Preferably, the base member and the closure member are made from a structural resin material such as a glass filled nylon or a polyphthalamide. The complementary fastener means desirably include apertures in either the flanges or the closure member and resilient prongs extending from the other of the flanges or the closure member. The apertures and prongs are appropriately sized such that the prongs snap fit into the apertures thereby snap fitting the closure member onto the base member.

The base member has a first end section which may take the form of a leg. The leg preferably has a n aperture therethrough with a metal ring insert molded within the aperture for engagement with a fastener that affixes the clamp assembly to the automotive vehicle.

It is also recognized that in accordance with the invention, the arcuate recess section may be on the cover member and the flat pipe engaging section may be on the base member.

In accordance with another aspect of the invention, a pipe and clamp assembly includes a pipe element having a corrosion resistant coating and an indented recess section. The clamp includes a base member and a cover member. The base member has a first end section constructed for securement to a fixed support. The base member and the cover are constructed to be fastened together about said pipe axially positioned with the indented recessed section on the pipe and forming a complementary shaped section keyed into the recessed section for preventing axial slippage of pipe and for preventing rotation of the pipe within the clamp.

In accordance with another embodiment of the invention, a method of rotationally and axially affixing a fluid flow pipe to an automotive vehicle includes the steps of providing a cylindrical pipe; applying a corrosion resistant coating on said pipe; stamping an indented flat onto a portion of said pipe. After the stamping of the flat and the application of the corrosion resistant coating, the coated and stamped pipe is assembled into a clamp that is securable to a fixed support such that a portion of the clamp abuts against the indented flat and axially extends along the entire length of the flat such that said pipe is rotationally and axially affixed to the clamp. Desirably, the method also includes the clamp comprising a base member and separate cover member being snap fitted together during the assembly step with the pipe affixed through an opening formed in the assembled clamp.

In this fashion, a corrosion resistant pipe is secured against rotational and axial motion with respect to a clamp while maintaining the intended advantages of the corrosion resistant coating of the pipe that is applied before assembly in an economical manner.

BRIEF DESCRIPTION OF THE DRAWINGS

Reference now is made to the accompanying drawings in which:

FIG. 4 is a side elevational and partially segmented view of the base member shown in FIG. 2;

FIG. 5 is an elevational view taken along lines 5—5 shown in FIG. 4;

FIG. 6 is an elevational view taken along lines 6—6 shown in FIG. 4;

FIG. 7 is an elevational view of the cover plate shown in FIG. 1;

FIG. 8 is an elevational view of the cover plate taken along lines 8—8 as shown in FIG. 7;

FIG. 9 is a cross-sectional view of the pipe and clamp assembly taken along lines 9—9 as shown in FIG. 3; and FIG. 10 is a fragmentary view similar to FIG. 4 illustrating an alternate embodiment.

DETAILED DESCRIPTION OF THE PREFERRED EMBODIMENT

Figure 1:
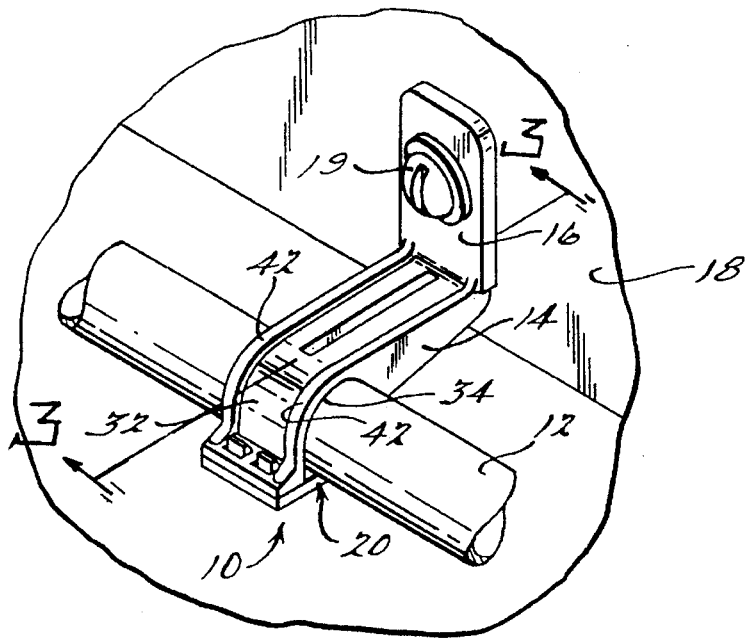
FIG. 1 is a perspective view of a pipe and clamp assembly illustrating one embodiment in accordance with the invention mounted in an automotive vehicle engine compartment.

Referring now to FIG. 1, a pipe and clamp assembly 10 includes a pipe element 12 secured with a two piece clamp 14. The clamp 14 includes a base member 16 secured to a wall 18 of an automotive engine compartment via a threaded fastener 19. The clamp 14 also includes a cover member 20 snap fitted onto the base member 16 to surround the pipe element 12.

Figure 2:
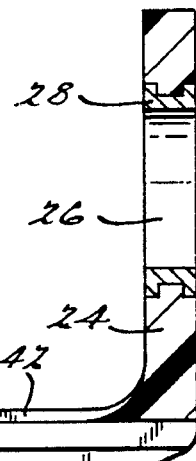
FIG. 2 is a perspective view of the pipe element shown in FIG. 1.

The pipe element 12, as shown in FIG. 2, is formed from a metal material such as steel and is coated with a state of the art commercially available corrosion resistant coating such as a galvanized coating or protective polymer coating. The corrosion resistant coated pipe is then stamped with an indented flat 22. The flat area 22 can be formed by a conventional stamping process which does not break the integrity of the corrosion resistant coating.

Figure 3:
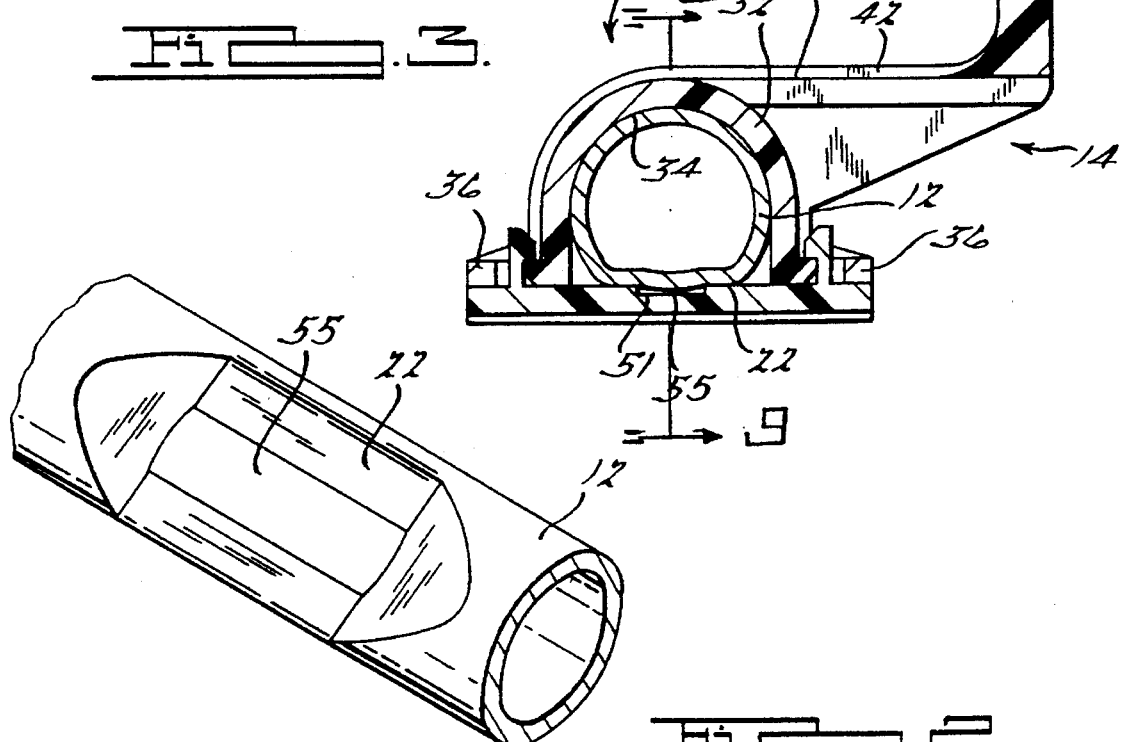
FIG. 3 is a cross-sectional view of the pipe and clamp assembly taken along lines 3—3 shown in FIG. 1.

The clamp 14 is made from a structural thermoplastic resin material such as a glass filled nylon. For higher temperature requirements, a polyphthalanide would be suitable. As shown in FIGS. 3 and 5, the base member 16 has a leg section 24 with a hole 26 therethrough. A metal reinforcing ring 28 is anchored into the hole 26 to prevent wear and tear when it engages the threaded fastener 19 that fastens the clamp 14 onto wall 18. The anchoring may be accomplished by an insert molding the ring 28 to the base member. The leg, as shown, is bent at approximately a 90° angle to a pipe engaging section 32. However, any other angle for the leg can be chosen depending on the mounting requirements and position and clearance requirements for the particular application. The pipe engaging section 32 includes an arcuate recess 34 terminating at two opposing flanges 36, as shown in FIG. 4. The radius of the arcuate section corresponds to the outer radius of the pipe element 12. Each flange 36 has two rectangular apertures 38 therethrough as shown in FIG. 6. As each aperture 38 has in cross-section an outwardly facing tapered shoulder 40. As shown in FIGS. 3 and 5, the pipe engaging section 32 has reinforcing ribs 42 molded therein extending longitudinally from the leg section 24 to the pipe engaging section 32 opposite the arcuate recess to add structural rigidity to the clamp base member 16.

The cover member 20, as shown in FIGS. 3, 7 and 8, is a generally planar element with fastening prongs 44 integrally molded and extending upwardly from a generally planar flat surface 46 of the cover member 20. The prongs 44 are used to snap fit the cover member 20 and base member 14 together. More specifically, each prong 44 has a inclined top wall 48 and undercut shoulder 50. The inclined top wall 48 provides ease of entry into the apertures 38 with angled taper 40 and allows the prongs to flex to pass completely through the apertures and have its undercut shoulder 50 engage the surface 52 of flanges 36. A longitudinally extending rib 49 along each edge of member 20 adds to the structural rigidity of the cover member 20. A center groove 51 runs across the flat section 46 and can engage a longitudinal rib 55 in indented flat 22.

As clearly shown in FIG. 9, the flat 22 has an axial distance that is substantially the same as the width of cover member 20 such that the cover member 20 can be fitted across the flat 22 as shown in FIG. 1 with its respective edges 53 abutting against respective rises 54 at opposite ends of the flat 22.

The prongs 44 provide a self tightening feature. If the cover 20 is pulled from its center which would happen if an attempt is made to pry it open with a screw drive or similar tool, the prongs 44 bend inwardly to tighten the hold within the apertures 38.

The method for providing the clamp assembly commences with manufacturing a cylindrical pipe. The cylindrical pipe is then coated with a corrosion resistant coating. The pipe is also stamped to provide flat 22 therein. It is appreciated that the stamping of the pipe does not affect the integrity of a previously applied corrosion resistant coating. It is also appreciated that the corrosion resistant coating can be applied after the stamping of the flat 22.

After the pipe is provided with both the corrosion resistant coating and the flat 22, the pipe is then positioned in the clamp base member 10 such that its flat 22 is substantially planar with the flanges 36 and its opposite radius section abuts the pipe engaging section along the arcuate recess. The cover is snap fitted onto the base member capturing the flat such the pipe is axially and rotationally fixed to the clamp 14.

The leg section 24 can be affixed to the wall 18 or other equivalent support before or after the pipe and cover are affixed to the base member.

A second embodiment of a clamp base 116 is shown in FIG. 10. The clamp base 116 has a pipe engaging section 132 capable of receiving and retaining two parallel extending pipes (not shown). Section 132 has two parallel arcuate recesses 134 interposed between opposing flanges 136. The cover 20 is snap fitted in the same fashion as described above to retain the pipes.

Other variations and modifications are possible without departing from the scope and spirit of the present invention as defined by the appended claims.

The embodiments in which an exclusive property or privilege is claimed are defined as follows:

1. A bracket for supporting and affixing an automotive fluid containing pipe element having an indented section with respect to an automotive vehicle in lateral, axial and rotational directions, said bracket characterized by:

a base member having a first end section constructed for securement to said automotive vehicle;

said base member having an arcuate section sized to receive a pipe element;

opposing flanges extend radially outward from opposite ends of said arcuate section;

a closure member having a substantially planar surface and adapted to engage said indented section in said pipe element; and said closure member and opposing flanges having complementary fastener elements for affixing said closure member to said flanges whereby the substantially planar surface limits axial slippage of said pipe and prevents rotation of said pipe within said clamp.

2. A bracket as defined in claim 1 further characterized by:

said base member and said closure member being made from an elastomeric material; and said complementary fastener means including slots in one of said flanges and said closure member and resilient prongs extending from the other of said flanges and said closure member;

said resilient prongs being sized such that said prongs snap fit into said slots to snap fit said closure member onto said flanges.

3. A bracket as defined in claim 2 further characterized by:

said first end section of said base member having an aperture therethrough with a metal ring insert molded within said aperture.

4. A bracket for supporting and affixing an automotive fluid containing pipe element having an indented section with respect to an engine compartment of an automotive vehicle, in lateral, axial and rotational directions said bracket characterized by:

a base member having a first end section constructed for securement to said engine compartment;

said base member having a pipe engaging section;

opposing flanges extend radially outward from opposite ends of said pipe receiving section; said respective closure member and said opposing flanges; and one of said closure member and said pipe engaging section of said base member having an arcuate recess for laterally receiving said pipe element and the other of said closure member and said pipe engaging section of said base member having a substantially planar surface adapted to engage said indented section in said pipe element for limiting axial slippage of said pipe element and for preventing rotation of said pipe element within said clamp.

5. A bracket as defined in claim 4 further characterized by:

said base member and said closure member being made from a thermoplastic resin material; and said complementary fastener means including apertures in one of said flanges and said closure member and resilient prongs extending from the other of said flanges and said closure member and being sized such that said prongs snap fit into said apertures to snap fit said closure member onto said flanges.

6. A bracket as defined in claim 5 further characterized by:

said first end section of said base member having a circular hole therethrough with a metal ring press fitted within said hole.

7. A pipe and clamp assembly characterized by;

a pipe element having a corrosion resistant coating;

said pipe element having an indented recessed section extending substantially the axial width of said clamp;

a clamp including a base member and a cover member;

said base member having a first end section constructed for securement to a fixed support;

said base member and said cover constructed to be fastened together about said pipe at a position axially aligned with said indented recessed section on said pipe and forming a complementary shaped section keyed into said indented recess for preventing axial slippage of said pipe and for preventing rotation of said pipe within said clamp.

8. A pipe and clamp assembly as defined in claim 7 further characterized by:

said base member and said closure member being made from an elastomeric material; and said base member and said closure member being constructed to snap fit together about said pipe element.

9. A pipe and clamp assembly as defined in claim 8 further characterized by:

complementary fastener devices on said base member and said closure member for snap fitting said two members together about said pipe element;

said fastener devices including apertures in one of said base member and closure member and resilient prongs extending from the other of said base member and said closure member and being sized such that said prongs snap fit into said apertures to snap fit said closure member onto said base member.

10. A pipe and clamp assembly as defined in claim 9 further characterized by:

said first end section of said base member having a hole therethrough with a metal ring press fitted within said hole.

11. A method of rotationally and axially affixing a fluid flow pipe to an automotive vehicle; said method characterized by:

providing a cylindrical pipe;

applying a corrosion resistant coating on said pipe;

stamping an indented flat onto a portion of said pipe;

assembling said coated and stamped pipe into a clamp that is securable to a fixed support such that a portion of said clamp abuts against said indented flat and axially extends along the entire length of said flat such that said pipe is rotationally and axially secured to said clamp.

12. A method as defined in claim 11 further characterized:

said clamp having a base member and separate cover member which are snap fitted together during the assembly step with the pipe affixed through an opening formed in said assembled base member and cover member.

* * * * *